United States Patent [19]

Leinen et al.

[11] 4,168,332

[45] Sep. 18, 1979

[54] NON-GLARE GLASS COATING

[75] Inventors: Roger W. Leinen, Woodbury; Jerome A. Pieterick, St. Paul; Wayne A. Pletcher, Roseville; Janis Robins, St. Paul, all of Minn.

[73] Assignee: Minnesota Mining and Manufacturing Company, St. Paul, Minn.

[21] Appl. No.: 932,460

[22] Filed: Aug. 10, 1978

Related U.S. Application Data

[63] Continuation-in-part of Ser. No. 843,875, Oct. 20, 1977, abandoned.

[51] Int. Cl.$^2$ .................. B05D 1/02; C08L 63/00; C08L 83/06
[52] U.S. Cl. .................. 427/160; 260/37 EP; 260/37 SB; 427/162; 427/164; 427/168; 528/23; 528/27
[58] Field of Search ............... 427/160, 162, 164, 168, 427/37 SB, 37 EP; 260/824 EP

[56] References Cited

U.S. PATENT DOCUMENTS

| 3,955,035 | 5/1976 | Ito et al. | 428/447 X |
| 4,049,986 | 9/1977 | Nozari | 427/387 X |

*Primary Examiner*—James R. Hoffman
*Attorney, Agent, or Firm*—Cruzan Alexander; Donald M. Sell; Mark A. Litman

[57] ABSTRACT

A non-glare, abrasion resistant coating can be produced by spraying a polymerizable composition onto a surface. The composition comprises an epoxy prepolymer of an epoxy-terminated silane and an oxirane comonomer in solution. The composition may be conveniently applied from an aerosol can.

13 Claims, No Drawings

NON-GLARE GLASS COATING

This application is a continuation-in-part of copending application Ser. No. 843,875, filed Oct. 20, 1977, and now abandoned.

Valuable or treasured pictoral art works are often protected by glass enclosures. Family pictures, lithographic prints and other art works are usually placed in a frame with a sheet of glass or plastic overlying the work. The sheet protects the art work from air-borne dirt and the probing fingers of admirers and serves a useful protective function. These protective cover sheets can also detract from the aesthetic appearance of the work because the sheet usually reflects light on its surface and causes a glare which interferes with a viewer's ability to fully appreciate the work.

In order to reduce the glare from covering sheets, the surface of the sheets have often been optically modified. This has been done by embossing the sheet, embossing an over-coat layer, or otherwise altering the surface characteristics of the sheet so that it is not prefectly smooth and will not act as a mirror surface and reflect light evenly. These types of surface modifications work from a technical standpoint, but suffer from a number of disadvantages. Most of the resin overcoat layers are readily subject to marring and removal and are often difficult to apply evenly over the surface of the glass except by costly processing techniques. These problems do not lend the prior art technology to use by the general public, and in particular do not enable high-quality non-glare coatings to be marketed in aerosol form.

Another method of reducing glare, limited to glass sheeting, is hydrofluoric acid etching. Sheets of glass have their surfaces etched by the application of HF thereto. Such processing is difficult and dangerous because of the strong acid used. Apparatus which transports the glass often grips the surface of the sheet and leaves areas that have not been etched. The disadvantages of this technique can be readily seen.

The present invention relates to a composition and method of applying the composition which are useful in forming non-glare, mar resistant finishes on substrates.

U.S. Pat. Nos. 3,955,035 and 4,049,861 disclose abrasion resistant layers and coatings derived from epoxy-functional polyfunctional silanes. These coatings are shown to be able to form abrasion resistant coatings of optical quality, and far exceed other existing abrasion resistant technology. These systems are based on polymers derived from epoxy-terminated silanes of the formulae:

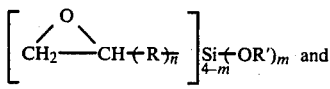 and

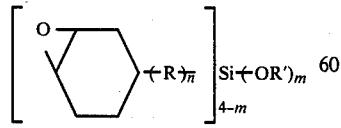

wherein,
each R is independently a non-hydrolyzable divalent hydrocarbon radical of less than 20 carbon atoms, or a divalent radical of less than 20 carbon atoms the backbone of which is C atoms which may be interrupted by individual atoms from the group of N and O, the O atoms in the form of ether linkages, m is 1, 2, or 3, n is 0, or 1, and R' is an aliphatic hydrocarbon radical of less than 10 carbon atoms, an acyl radical of less than 10 carbon atoms, or a radical of the formula $(CH_2CH_2O)_kZ$ in which k is an integer of at least 1, and Z is hydrogen or an aliphatic hydrocarbon radical of less than 10 carbon atoms.

Preferred epoxy-terminated silanes are those of the formula:

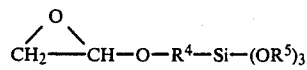

wherein
$R^4$ is alkylene of 1 to 8 (preferably, 1 to 4) carbon atoms and $R^5$ is alkyl of 1 to 6 carbon atoms. Polymers of these materials may be worked during cure to provide surface characteristics, but this would still require expensive processing techniques by the manufacturer to effect good quality non-glare surfaces.

U.S. application Ser. No. 782,079, filed Mar. 28, 1977 relates to prepolymers of these monomers and abrasion resistant coatings derived therefrom. These materials also afford excellent coatings, but would require skilled processing to effect good quality non-glare coatings.

It has been found in the present invention that epoxy propolymers of epoxy-terminated silanes and epoxy comonomers of a desired range of polymerization (some of which can be made according to U.S. Ser. No. 782,079) may be further cured when dissolved in a solvent at 5–40% by weight solids prepolymer, and sprayed in fine droplets onto a surface to form a uniform, non-glare, mar resistant coating.

The deliverable compositions of this invention are comprised of 5–40% by weight solids. The solids comprise 75–100% by weight of prepolymer and 25–0% by weight of hydrophobic silica particles of 0.0005 to 0.050 microns in average diameter. The prepolymer comprised of 10–50% weight of an oxirane comonomer and 90–50% by weight of epoxy-terminated silane in solution with a volatile solvent, and an active amount of a catalyst for silane hydrolysis. The catalyst may be present in amounts as small as 0.005% by weight up to 10% by weight depending on the amount necessary to obtain the activity desired in the cure of the silane.

More preferred ranges are 10–30% solids in the composition, 15–35% by weight comonomer and 85–65% by weight epoxy-terminated silane. Compositions containing 10–25% by weight of the solids as hydrophobic silica are most preferred. The hydrophobic silica should have less than 3% by weight surface hydroxyl groups, preferably has less than 1% by weight surface hydroxyl groups, and most preferably less than 0.5% by weight hydroxyl groups.

Preferred Catalysts

The most preferred catalysts according to the present invention are highly fluorinated aliphatic sulfonylic catalysts. The related highly fluorinated aliphatic sulfonic catalysts are very useful, but less preferred. The sulfonic materials are defined as a highly fluorinated aliphatic sulfonic acid or salt thereof. The sulfonylic materials are defined as a compound containing two highly fluorinated aliphatic sulfonyl groups attached directly to an imide or methylene $$(\text{e.g., } -\text{NR}'- \text{ or } -\overset{|}{\underset{|}{\text{CR}'\text{R}''}}-).$$

The sulfonic materials are less preferred than the sulfonylic catalysts and may be represented by the formula $$(R_fSO_3)_nR$$

wherein
R is hydrogen, ammonium cation or metal cation and n is the valence of R.

The preferred sulfonylic catalysts may be represented by the formula $$(R_fSO_2)-Q-(SO_2R'_f)$$

wherein
Q is a divalent radical selected from $$-\overset{|}{\underset{|}{\text{NR}}}, -\overset{|}{\underset{|}{\text{CR'R''}}} \text{ and } -\overset{|}{\underset{|}{\text{C}}}=CHR^3$$

wherein
R'' is selected from hydrogen, chlorine, bromine, iodine, $R_fSO_2-$, alkenyl of 3-4 carbon atoms, alkyl of 1 to 20 carbon atoms (preferably 1 to 4), aryl of 1 to 20 carbon atoms (preferably to 10, and for example, phenyl, naphthyl, pyridyl, benzthienyl, etc.), and alkaryl of 7 to 20 carbon atoms (preferably to 10), R' is selected from hydrogen, chlorine, bromine, iodine, ammonium cations or metal cations, and R' is H, alkenyl (3 to 4 carbon atoms) or aryl up to 20 carbon atoms.

The catalysts wherein the N or C atom bonded to the highly fluorinated aliphatic (preferably alkyl) group has a hydrogen atom bonded thereto are active catalysts. Those having no hydrogen atom are latent and may be activated by heat, acid, chelating agent or combinations thereof as known in the art.

In the practice of this invention, $R_f$ and $R'_f$ are independently highly fluorinated aliphatic radicals which are defined as fluorinated, saturated, monovalent, aliphatic radicals having 1 to 20 carbon atoms. The skeletal chain of the radical may be straight, branched, or, if sufficiently large (e.g., at least 3 or 5 atoms) cycloaliphatic, and may be interrupted by divalent oxygen atoms or trivalent nitrogen atoms bonded only to carbon atoms. Preferably the chain of the fluorinated aliphatic radical does not contain more than one hetero atom, i.e., nitrogen or oxygen, for every two carbon atoms in the skeletal chain. A fully fluorinated group is preferred, but hydrogen or chlorine atoms may be present as substituents in the fluorinated aliphatic radical provided that not more than one atom of either is present in the radical for each carbon atom. Preferably, the fluoroaliphatic radical is a saturated perfluoroalkyl radical having a skeletal chain that is straight or branched and has a formula $$C_xF_{2x+1}$$

wherein
x has a value from 1 to 18.

The preferred sulfonylic active catalysts of this invention are those compound having the formula $$(R_fSO_2)-Q-(O_2SR'_f)$$

wherein
$R_f$ and $R'_f$ are independently a highly fluorinated alkyl group, and Q is a divalent radical selected from $-\text{NH}-$ and $-\text{CHR}-$, wherein R is selected from Br, Cl, I, H, alkyl groups of 1 to 20 carbon atoms (preferably 1 to 4), alkenyl of 3 to 4 carbon atoms, aryl or aralkyl of up to 20 carbon atoms (preferably up to 10), or R'X, wherein R' is an alkylene group of up to 20 carbon atoms (preferably 1 to 4) and X is H, Br, Cl, I, $-O_2SR_f$, $-\text{CH}(O_2SR_f)_2$, $$-\overset{|}{\underset{\text{Br}}{\text{CH}}}-(CH_2)_n-COOR^4,$$

or $-CY(COOR^2)_2$
wherein
$R^4$ is H or 1 to 8 alkyl and n is 0 to 8, and
wherein
$R^2$ is alkyl of 1 to 4 carbon atoms or phenylalkyl, the alkyl group of which has 1 to 4 carbon atoms, and Y is H, Br, Cl, I, or $NO_2$.

Ammonium cation as used in the present invention is defined as cations of ammonia, primary, secondary, tertiary and quaternary amines. Alkyl, aryl, alkaryl, etc., as used in the present invention (excluding $R_f$ type groups as elsewhere defined) includes such simple substituted groups as are recognized in the art as functional equivalents of the groups (e.g.,

).

Selection of a most preferred perfluoroalkylsulfonyl methane catalyst is dependent on the particular monomer composition in which the catalyst is to be used and the application for which the composition is to be used.

Although their use is not necessary in the compositions of the invention to effect a cure of coatings of the composition, it is often preferable to include in addition to the fluoroalkylsulfonyl protonic acid catalysts from about 0.01 to 5 percent and preferably about 0.1 to 2 percent of a second siloxane hydrolysis and/or condensation catalyst.

Other additives besides those essential to the practice of the invention may be added to the compositions used in the practice of the present invention. For example, dyes may be used to provide a toning effect, ultraviolet absorbers may be used to protect the covered material from damaging radiation, etc. The use of ultraviolet radiation absorbers particularly provides advantages.

Ultraviolet Absorbers

Ultraviolet absorbers within the preferred practice of this invention fall into the following classes: BENZOPHENONES: This class comprises substituted 2-hydroxybenzophenones. They are available with a variety of substituents on the basic molecule to provide proper compatibility, non-volatility, and particular absorption properties. Typical substituted 2-hydroxybenzophenones are 2-hydroxy-4-methoxy-benzophenone, 2-hydroxy-4-octyloxybenzophenone, 4-dodecyloxy-2-hydroxybenzophenone, and 2,2'-dihydroxy-4,4'-dimethoxybenzophenone. The art recognizes substituted 2-hydroxybenzophenones as a class. BENZOTRIAZOLES: This class comprises derivatives of 2-(2'-hydroxyphenyl)benzotriazole. Typical examples are 2-(2'-hydroxy-5'-methylphenyl)benzotriazole and 2-(2'-hydroxy-5'-octylphenyl) benzotriazole. Substituted 2-(2'-hydroxyphenyl)benzotriazoles are also an art recognized class of ultraviolet radiation absorbers.

SUBSTITUTED ACRYLATES: These are another art recognized class of UV absorbers. Typical examples are ethyl-2-cyano-3,3-diphenyl acrylate, 2-ethylhexyl-2-cyano-3,3-diphenyl acrylate, and p-methoxy-benzylidene malonic acid dimethyl ester.

ARYL ESTERS: This art recognized class includes aryl salicylates, benzoates, and esters of resorcinol. Typical examples are phenyl salicylate, p-t-oxtylphenyl salicylate, resorcinol monobenzoate, and 2,4-di-t-butylphenyl-3,5-di-t-butyl-4-hydroxybenzoate. Combinations of these UV absorbers are often used to aggregate the properties of the individual absorbers. Preferred absorbers are (I) 2,4-dihydroxybenzophenone, (II) 2,2'4,4'-tetrahydroxybenzophenone, (III) 2-(2'-hydroxy-5-methylphenyl)-benzotriazole, and (IV) 2-(3',5'-di-t-amyl-2'hydroxyphenyl)-benzothiazole.

The epoxy-terminated silane and the epoxy comonomer should be reacted to a degree to afford a prepolymer of 50–400 number average molecular size in Angstrom units as determined by gel permeation chromatography (approximately 750–16,000 number average molecular weight).

Molecular weight distributions and percentages were determined with a gel permeation chromatograph (GPC). Commercially available instruments perform this evaluation by separating polymeric species according to molecular size (which with known monomeric species can be correlated to molecular weight). Dilute solutions (one-eight to one-half percent) of the polymer of interest are passed through a packed column containing uniformly crosslinked polystyrene gel. The abscissa on a typical chromatogram from this process is usually calibrated in Angstrom units, and refers to the average size of the species used to calibrate the GPC chromatogram, which in the practice of the present invention was soluble in the carrier, tetrahydrofuran. The ordinate is proportional to the weight of polymeric species eluting at a particular time.

All of these examples were performed in a closed vessel so as to exclude water vapor which would hydrolyze the silane groups.

The epoxy comonomers used with the system of the present invention are alicyclic, aliphatic, or mixed aliphaticcyclic oxiranes. Representative generic formulae for some of these comonomers are:

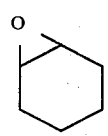 (1)

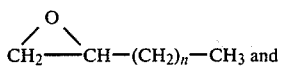 (2)

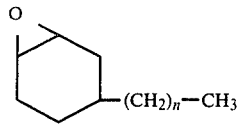 (3)

wherein n is 0 or a whole positive integer of 1 to 12. The cyclic groups may be further substituted, the aliphatic groups may be branched-chain moieties, and the compounds may be less preferably polyepoxides (e.g., diepoxides) also.

Examples of some useful comonomers within these general formulae are:

cyclohexene oxide 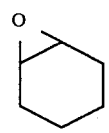 (1)

dodecene oxide
octylene oxide,
butylglycidyl ether, (2)

phenylglycidyl ether, (3)
α-pinene oxide, and 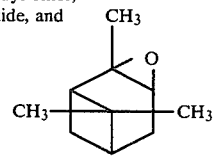

limonene monoxide 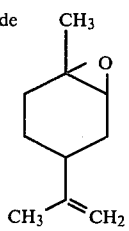

Catalysts useful for curing the silane after spraying onto the surface to be coated are preferably those which rapidly cure the silane. If the silane portion is not rapidly cured, there is an increased likelihood of droplets coalescing on the surface or running off the surface or individual drops being moved by physical force such as wind or accidental touching of the droplets. Under ideal conditions, any silane hydrolysis catalyst will work, but preferably a silane hydrolysis catalyst which will render tetraethoxy silane tack free in the presence of 60 percent relative humidity in less than one half hour at 90° C. is to be used. Preferably the catalysis should cure the tetraethoxy silane to a tack free state in from 30 seconds to 15 minutes at 60% relative humidity and 30° C. Such catalysts include aromatic onium catalyst (e.g., phosphonium, iodonium, sulfonium, diazonium catalysts such as those of U.S. patent application Ser. No. 764,817, filed Feb. 2, 1977), highly fluorinated aliphatic sulfonyl and sulfonic catalysts (e.g., bis-(highly fluorinated aliphatic sulfonyl) methanes and imides, highly fluorinated aliphatic sulfonic acids and salts thereof, such as those of U.S. Pat. No. 4,049,861), Lewis acids (SbF$_5$, HSbF$_6$, SbCl$_5$, PF$_5$, etc.), and other fast acting catalysts of the classes known to be useful for the hydrolysis of silanes (Bronstad acids, protonic acids, etc.).

The amount of catalyst necessary will depend on the special characteristics and activity provided by individual catalysts. Some have been found useful in amounts as low as 0.001% by weight of the solution before application and others may be required in amounts as high as 10% by weight to achieve a sufficiently rapid and complete cure.

EXAMPLE 1

A prepolymer was formed as follows under anhydrous conditions. 396.7 grams γ-glycidoxypropyltrimethoxysilane were mixed with 170.0 grams α-pinene oxide, and 10.0 grams $(CF_3SO_2)_2CHC_6H_5$ in 90.7 grams of 1,1,1-trichloroethane in a 1000 ml 3-necked flask with condensor, dehumidifying column and thermometer. The epoxy-terminated silane and epoxy were mixed and the catalyst dissolved in the trichloroethane was added with vigorous stirring and cooling in 2–4 cc aliquots approximately every 5 minutes. The temperature was maintained below 30° C. during the two and one-half hour reaction period. The prepolymer was aged for 18 hours at 28° C. in a jar purged with $N_2$ to remove air and moisture. The final viscosity was 77.5 cp as measured on a Brookfield viscometer with an ultralow adaptor for water thin liquids.

A separate premix of 96.0 grams of a fumed, hydrophobic silica, 1400 grams 1,1,1-trichloroethane, and 200 grams of methylethylketone was made in a high shear dispersion mixer.

The silica was of the following description:
(1) 0.007 microns nominal particle size diameter
(2) $N_2$ adsorption surface area 225 m$^2$/g
(3) 3.0 lb/ft$^3$ bulk density
(4) 2.2 specific gravity
(5) 1.76 refractive index
(6) amorphous x-ray form The silica had less than 1% surface hydroxyl groups.

A second prepolymer of only γ-glycidoxypropyl-trimethoxysilane (400 g), 8 grams of $(CF_3SO_2)_2CHC_6H_5$, and 40 grams of 1,1,1,-trichloroethane was made under anhydrous conditions.

The aerosol mix was made by combining 667.7 grams of the comonomer prepolymer, 243 grams of the second prepolymer, 1105 grams of the silica premix, and 11.5 grams of $(CF_3SO_2)_2CHC_6H_5$ in 92.0 grams 1,1,1-trichloroethane. This was shaken for 5 minutes. The final viscosity was 714 cp.

77.0 grams of this aerosol mix was added with a propellant of 14.0 grams propane and 14.0 grams isobutane into an aerosol can.

From a distance of 12–16 inches the aerosol was evenly sprayed, gently overlapping the area previously sprayed. a 100 cm×100 cm glass pane was so coated and left undisturbed for 40 minutes, then wiped with a cheesecloth. A glare reducing, mar resistant surface was formed on the glass pane.

EXAMPLE 2

The first example was repeated except that no second prepolymer solution was made. The results were the same, with a glare reducing, mar resistant finish being placed on the glass.

EXAMPLE 3

12.48 grams of γ-glycidoxypropyltrimethoxy silane were mixed with 3.12 grams cyclohexene oxide in 1.56 grams methylene chloride. A second solution was prepared by warming 0.25 grams $(CF_3SO_2)_2CHC_6H_5$ in 1.56 grams methylene chloride. The catalyst solution was added dropwise to the monomer solution and cooled in an ice bath so that the temperature did not exceed 30° C. The monomer was then allowed to sit at room temperature under anhydrous conditions for 24 hours. 1.85 grams of the hydrophobic silica used in Example 1 was added to 30.75 grams of 1,1,1-trichloroethane in a high shear dispersion mixer and the mixture added to the reacted solution. This final solution was added to 5.00 grams methylene chloride with 0.234 $(CF_3SO_2)_2CHC_6H_5$ dissolved therein and put into an aerosol can with 13.00 grams propane.

The composition was sprayed onto a glass pane from a distance of 12–16 inches and produced a mar resistant non-glare coating after being left undisturbed for two hours at room temperature.

EXAMPLE 4

9.36 grams of γ-glycidoxypropyltrimethoxysilane was mixed with 6.24 grams of

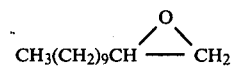

in 1.56 grams of methylene chloride. A second solution of 0.25 grams $(CF_3SO_2)_2$—$CHC_6H_5$ in 1.56 grams of methylene chloride was prepared. The second solution was added dropwise to the first and the temperature of the first solution maintained below 30° C. by an ice bath. The solution was allowed to react for 24 hours under anhydrous conditions after both solutions had been combined.

1.85 grams of the hydrophobic silica of Example 1 was mixed in a high shear dispersion mixer with 7.69 grams of methylethylketone and 23.06 grams 1,1,1-trichloroethane. This solution was added to the reacted materials in solution.

0.156 grams of $(CF_3SO_2)_2CHC_6H_5$ were dissolved in 4.0 grams of methylene chloride and added to the previously combined ingredients. This solution was put into an aerosol can with 10.0 grams propane and 10.0 grams isobutane as propellant.

The composition was applied to a glass pane by spraying from a distance of 12–16 inches. After being left undisturbed for 24 hours, a mar resistant, non-glare coating remained on the glass surface.

Although the examples show aerosol spray application of the compositions in forming non-glare coatings on surfaces that reflect light, any spraying means that produces fine spray particles and impacts them on the surface can be used. Such other spray techniques are within the skill of the artisan. Aerosol spray application of course requires a container, propellant and an element which allows the composition to be released under pressure so as to be emitted as a spray.

Any compatible solvent for the compositions of the present invention is useful. Preferred solvents are those which will rapidly evaporate at room temperature. If 10 grams of a solvent spread on a 100 cm square area will evaporate in less than 30 minutes at 30° C., the solvent is particularly useful. Preferred solvents would evaporate in less than 15 minutes under these conditions, and most preferred solvents in less than 5 minutes. For storage stability, the compositions should have less than 0.5% by weight moisture, preferably less than 0.25%, and most preferably should be anhydrous.

EXAMPLE 5

12.48 grams of γ-glycidoxypropyltrimethoxy silane was mixed with 3.12 grams of α-pinene oxide and 1.56 grams of methylenechloride. 0.25 grams of (CF$_3$SO$_2$)$_2$CHC$_6$H$_5$ was dissolved in 1.56 grams of methylene chloride, then added dropwise to the monomer solution. The monomer solution was cooled in an ice bath so that the temperature did not exceed 30° C. After addition of the catalyst solution, the monomer solution was allowed to stand at room temperature under anhydrous conditions for 24 hours. The number average molecular size was between 50 and 400 Angstroms.

23.06 grams methylethylketone and 7.69 grams 1,1,1-trichloroethane were mixed in a high shear dispersion mixer with 1.85 grams of the silica of Example 1. This silica dispersion was added to the aged monomer solution. 0.234 grams of (CF$_3$SO$_2$)$_2$CHC$_6$H$_5$ dissolved in 4.0 grams methylene chloride was then added to the monomer solution with the silica therein. This final solution was added to an aerosol can, the valve inserted and crimped into place and 10.0 grams each of propane and isobutane were added as a propellant.

The composition was sprayed onto a glass substrate from a distance of 12 to 16 inches. The coating was applied thin enough so that the fine droplets of the spray were not able to coalesce and form a smooth surface on the glass. The surface was covered with disuniform specks of the prepolymer which cured in atmospheric moisture to form a glare-reducing, mar resistant finish on the glass plate.

The silica particles assist in maintaining the droplets in discrete form after the fine spray particles strike and impinge the surface to which they adhere and then cure. Preferably the compositions will contain at least 1% by weight of hydrophobic silica particles.

What is claimed is:

1. A method of producing a non-glare coating on a reflective surface which comprises spraying a polymerizable composition onto a reflective surface and allowing said composition to cure in the presence of water, said composition being sprayed in the form of fine droplets, and said composition comprising 5–40% by weight of solids in solution, said solids comprising:
   (1) 75–100% by weight of an epoxy prepolymer comprised of 90–50% by weight of an epoxyterminated silane and 10–50% by weight of alicyclic, aliphatic, or mixed aliphaticcyclic oxiranes, the prepolymer having a number average molecular size of 50–400 Angstroms, and
   (2) 0–25% by weight of hydrophobic silica particles of 0.0005 to 0.050 microns in average diameter,
the composition further comprising a catalytically active amount of a silane hydrolysis catalyst.

2. The method of claim 1 wherein said epoxy-terminated silane is represented by the formula:

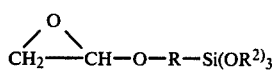

wherein
R is alkylene of 1 to 8 carbon atoms and R$^2$ is alkyl of 1 to 6 carbon atoms.

3. The method of claim 2 wherein the oxiranes are represented by the formulae:

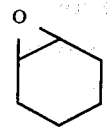 (1)

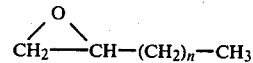 (2)

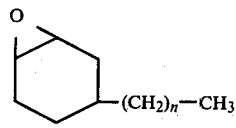 (3)

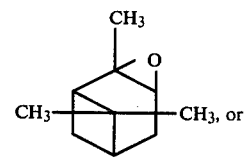 (4), or

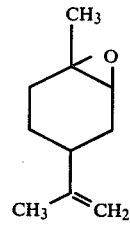 (5)

wherein
n is a positive integer of 1 to 12.

4. The method of claim 3 in which the silane hydrolysis catalyst is selected from the group consisting of (1) highly fluorinated aliphatic sulfonyl catalysts, (2) highly fluorinated aliphatic sulfonic acid or salt catalysts, (3) Lewis acids, (4) Bronstad acids, or (5) protonic acids which can cure tetraethoxy silane to a tack free state at 90° C. and 60% relative humidity in less than 30 minutes.

5. The method of claim 4 in which the hydrophobic silica has less than 1% by weight surface hydroxyl groups and is present at 10–25% by weight solids in the composition.

6. The method of claim 4 in which the composition further comprises an effective amount of ultraviolet absorbers.

7. The method of claim 2 in which the silane hydrolysis catalyst is selected from the group consisting of (1) highly fluorinated aliphatic sulfonyl catalysts, (2) highly fluorinated aliphatic sulfonic acid or salt catalysts, (3) Lewis acids, (4) Bronstad acids, or (5) protonic acids which can cure tetraethoxy silane to a tack free state at 90° C. and 60% relative humidity in less than 30 minutes.

8. A composition of 5–40% by weight solids in solution which can be sprayed to form a non-glare abrasion resistant coating, the solids of which comprise:
   (1) 75–100% by weight of an epoxy prepolymer comprised of 90–50% by weight of an epoxy-terminated silane and 10–50% by weight of alicyclic, aliphatic, or mixed aliphaticcyclic oxiranes, the prepolymer having a number average molecular size of 50–400 Angstroms, and (2) hydrophobic silica particles having an average diameter of 0.0005 to 0.050 microns in an amount up to 25% by weight and in the solution, a catalytically active amount of a silane hydrolysis catalyst capable of curing tetraethoxy silane tack free in less than 30 minutes at 90° C. and 60% relative humidity.

9. The composition of claim 8 in which the oxirane is represented by any of the formulae:

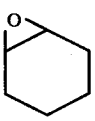 (1)

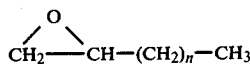 (2)

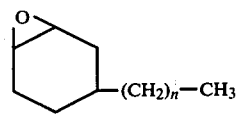 (3)

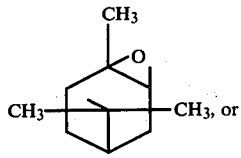 (4)

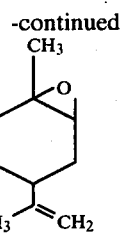 (5)

wherein
n is a positive integer of 1 to 12.

10. An aerosol can containing the composition of claim 9.

11. The aerosol can and composition of claim 10 wherein the epoxy-terminated silane is represented by the formula:

$$\overset{O}{\underset{CH_2-CH}{\triangle}}-O-R-Si(OR^2)_3$$

wherein
R is alkylene of 1 to 8 carbon atoms and $R^2$ is alkyl of 1 to 6 carbon atoms.

12. The aerosol can and composition of claim 11 wherein the silane hydrolysis catalyst is selected from the group consisting of (1) highly fluorinated aliphatic sulfonyl catalysts, (2) highly fluorinated aliphatic sulfonic acid or salt catalysts, (3) Lewis acids, (4) Bronstad acids, or (5) protonic acids which can cure tetraethoxy silane to a tack free state at 90° C. and 60% relative humidity in less than 30 minutes.

13. An aerosol can containing the composition of claim 8.

* * * * *